United States Patent
Edwards

(10) Patent No.: US 10,228,442 B2
(45) Date of Patent: Mar. 12, 2019

(54) APPARATUS FOR TRACKING THE POSITION OF AT LEAST ONE PERSON WALKING ABOUT A STRUCTURE

(71) Applicant: Stuart Graham Edwards, Ashford (GB)

(72) Inventor: Stuart Graham Edwards, Ashford (GB)

(*) Notice: Subject to any disclaimer, the term of this patent is extended or adjusted under 35 U.S.C. 154(b) by 301 days.

(21) Appl. No.: 15/310,517

(22) PCT Filed: Apr. 13, 2015

(86) PCT No.: PCT/GB2015/000117
§ 371 (c)(1),
(2) Date: Nov. 11, 2016

(87) PCT Pub. No.: WO2015/173534
PCT Pub. Date: Nov. 19, 2015

(65) Prior Publication Data
US 2017/0074967 A1 Mar. 16, 2017

(30) Foreign Application Priority Data
May 14, 2014 (GB) .................................. 1408621.9

(51) Int. Cl.
*G01S 5/02* (2010.01)
*G01C 21/16* (2006.01)
*G01C 21/20* (2006.01)

(52) U.S. Cl.
CPC .......... *G01S 5/0294* (2013.01); *G01C 21/165* (2013.01); *G01C 21/206* (2013.01); *G01S 5/0263* (2013.01)

(58) Field of Classification Search
CPC ... G01C 21/165; G01C 21/206; G01S 5/0294; G06Q 30/0261; H04L 67/22
See application file for complete search history.

(56) References Cited

U.S. PATENT DOCUMENTS 8,659,429 B1 2/2014 Wagner et al.
9,086,470 B2 * 7/2015 Zaid .......................... G01S 5/14
(Continued)

*Primary Examiner* — Nizar N Sivji
(74) *Attorney, Agent, or Firm* — Iandiorio Teska & Coleman, LLP

(57) ABSTRACT

Apparatus (2) for tracking the position of at least one person (4) walking about a structure (6), which apparatus (2) comprises: (i) position-identifying means (8) for being worn by the person (4); (ii) a plurality of position-determining devices (10) for being positioned at known fixed positions throughout the structure (6) at which the person (4) must pass in order to move about the structure (6); and (iii) monitor means (12) for monitoring the position of a person (4) in a structure (6); and the apparatus (2) being such that: (iv) the position-determining devices (10) emit signals which are able to be received by the position-identifying means (8); (v) each position-determining device (10) emits signals which only travel a distance which is in the vicinity of the position-determining device (10), whereby as the person (4) walks about the structure (6), the position-determining devices (10) are in radio communication one at a time with the position-identifying means (8); (vi) the position-identifying means (8) is in radio contact with the monitor means (12); (vii) the monitor means (12) includes a plan of the structure (6) and the position of the position-determining devices (10), whereby the radio communication of the position-determining devices (10) one at a time with the position-identifying means (8) enables the monitor means (12) to track the position of the person (4) as the person (4) walks about the structure (6), with the position of the person (4) being determinable as being in the vicinity of each position-determining device (10) as it becomes in radio communication with the position-identifying means (8); (viii) the position-identifying means (8) includes an inertial measurement unit (14); and (ix) the position-identifying means (8) includes compass means which is compensated (Continued)

for magnetic distortion in the structure and which operates to correct any directional drift accumulated by the inertial measurement unit (4) other time; and the position-identifying means (8) is constructed for being worn on a part of the person (4) that enables the inertial measurement unit (14) to measure the gait of the person (4) as the person (4) is walking, whereby the inertial measurement unit (14) is able to indicate via the monitor means (12) a more exact position of the person (4) relative to each position-determining device (10) and also the direction of movement of the person (4) relative to each position-determining device (10).

15 Claims, 4 Drawing Sheets

(56) References Cited

U.S. PATENT DOCUMENTS

| | | | |
|---|---|---|---|
| 9,110,159 B2* | 8/2015 | Vartanian | G01S 15/08 |
| 2003/0023380 A1 | 1/2003 | Woloszyk et al. | |
| 2005/0143916 A1 | 6/2005 | Kim et al. | |
| 2013/0162481 A1 | 6/2013 | Parvizi et al. | |
| 2013/0342391 A1 | 12/2013 | Hoang et al. | |
| 2015/0177359 A1* | 6/2015 | Marron | G01S 5/0252 |
| | | | 455/456.6 |
| 2018/0033244 A1* | 2/2018 | Northrup | H04W 4/21 |
| 2018/0240176 A1* | 8/2018 | Cronin | G06Q 30/0631 |

\* cited by examiner

APPARATUS FOR TRACKING THE POSITION OF AT LEAST ONE PERSON WALKING ABOUT A STRUCTURE

This invention relates to apparatus for tracking the position of at least one person walking about a structure. The apparatus may be used for control or security purposes, for example for monitoring the position of security staff, workers or other persons in a structure, for example a building.

A major problem in tracking the position of a person walking about a structure is that certain parts of the structure may be such as to prevent the reception of GPS signals. Such problems may be especially prevalent in basement parts of a structure such for example as a building where concrete parts of the structure may be sufficiently thick to prevent the reception of GPS. It is not acceptable to have tracking apparatus which loses contact with a person in certain parts of a structure due to an inability to receive GPS. Video equipment may be employed to show the position of a person in substantially all parts of a structure. However the video equipment can be expensive. In addition the video equipment needs to be hard wired to control means, and the control means is therefore usually located in the structure. There are often situations where it is desirable to locate the control means remote from the structure, for example when it is required that the control means be operated from a central control station remote from the structure.

It is an aim of the present invention to reduce the above mentioned problems.

Accordingly, in one non-limiting embodiment of the present invention there is provided apparatus for tracking the position of at least one person walking about a structure, which apparatus comprises:

(i) position-identifying means for being worn by the person;
(ii) a plurality of position-determining devices for being positioned at known fixed positions throughout the structure at which the person must pass in order to move about the structure; and
(iii) monitor means for monitoring the position of a person in a structure;

and the apparatus being such that:

(iv) the position-determining devices emit signals which are able to be received by the position-identifying means;
(v) each position-determining device emits signals which only travel a distance which is in the vicinity of the position-determining device, whereby as the person walks about the structure, the position-determining devices are in radio communication one at a time with the position-identifying means;
(vi) the position-identifying means is in radio contact with the monitor means;
(vii) the monitor means includes a plan of the structure and the position of the position-determining devices, whereby the radio communication of the position-determining devices one at a time with the position-identifying means enables the monitor means to track the position of the person as the person walks about the structure, with the position of the person being determinable as being in the vicinity of each position-determining device as it becomes in radio communication with the position-identifying means;
(viii) the position-identifying means includes an inertial measurement unit;
(ix) the position-identifying means includes compass means which is compensated for magnetic distortion in the structure and which operates to correct any directional drift accumulated by the inertial measurement unit over time; and
(x) the position-identifying means is constructed for being worn on a part of the person that enables the inertial measurement unit to measure the gait of the person as the person is walking, whereby the inertial measurement unit is able to indicate via the monitor means a more exact position of the person relative to each position-determining device and also the direction of movement of the person relative to each position-determining device.

With the apparatus of the present invention, the use of the position-determining devices ensures that the apparatus is always able to operate in all parts of the structure. Thus the apparatus is able constantly to track the person walking about the structure, and there will be no loss of contact due to the person being in certain parts of the structure which are not able to receive GPS signals. The position-determining devices are relatively cheap and they are easily installed. The position-determining devices give the coarse position of the person as the person walks about the structure, with this coarse position being in the vicinity of the position-determining device that is in communication at any one time with the position-identifying means. The use of the inertial measurement unit in the position-identifying means enables the coarse position of the person by the position-determining device to be more finely determined. The inertial measurement unit is able to give the substantially exact position of the person relative to each position-determining device, and also the direction of movement of the person relative to each position-determining device. If the accuracy of measurements made by the inertial measurement unit tends to drift during prolonged monitoring periods, then any such drift is prevented by the position-determining devices as they become in communication with the inertial measurement unit. Thus the accuracy of the inertial measurement unit is able to be maintained over long monitoring periods.

The apparatus may be one in which the position-determining devices are passive infrared devices. Alternatively, the apparatus may be one in which the position-determining devices are radio frequency identification (RFID) devices. Alternatively, the apparatus may be one in which the position-determining devices are WiFi enabled devices, for example computers at fixed locations throughout the structure. The passive infrared devices may give more precise position location than the RFID devices and the WiFi enabled devices.

The apparatus may be one in which the inertial measurement unit comprises a gyroscope, and an accelerometer. The inertial measurement unit may also include an altimeter.

The apparatus may include orientation re-alignment means for re-aligning drift orientation errors occurred by the position-identifying means and/or the monitor means. The orientation re-alignment means may be a plurality of fiducial markers. The orientation re-alignment means, for example the fiducial markers, act as reference points. The reference points may be regarded as being fixed points or lines within a scene to which other objects can be related or against which objects can be measured. A camera may recognise the orientation re-alignment means, for example the fiducial markers, through a process of collimation. Thereafter, the re-alignment means can re-align the monitor means which may be, for example, a CAD tracker system, with the re-alignment being to the correct axis/orientation.

Alternatively, the orientation re-alignment means may be a plurality of magnets. In this case, the re-alignment means may provide a reference of orientation to a person using a three-axis fluxgate magnetometer sensor mounted on the person, from a wall-mounted reference sensor three-axis fluxgate magnetometer that has had its axes aligned with geographic north. Such an arrangement is able to provide a physical and constant reference which would not be subject to change. If the reference sensor is fixed horizontally to geographic north, then the readings from the reference sensor represent the position of the earth's field at that location relative to a physical orientation. Due to the physical alignment, the apparatus is able to correlate with the measurements from the person-mounted sensor.

The apparatus is preferably one in which the radio communication of the position-determining devices with the position-identifying means is via Bluetooth. Other wireless technology operating systems may be employed, for example operating at other radio frequencies then the radio frequencies used by Bluetooth for exchanging date over short distances.

The signals emitted by the position-determining devices may travel a distance of not more than approximately 1-10 meters, for example 2 meters. Short distances which are more or less than 2 meters may be employed. The signals emitted by the position-determining means may travel in a radius. If desired, three of the position-determining devices may be employed to get a triangulation for a more precise position of the person than is attainable from just one of the position-determining devices.

The position-determining devices may be positioned at doorways, lifts, halls and corridors of the structure. Generally, the position-determining devices may be positioned at various appropriate strategic positions. The structure may be, for example, a building, a nuclear or petro-chemical plant, a mine, or a high security building complex.

The position-identifying means may be adapted to be worn on a belt of the person. The position-identifying means may alternatively be positioned on an article of footwear. Generally, the position-identifying means may be worn where desired providing that it is worn on a part of the person that enables the inertial measurement unit to measure the gait of the person as the person is walking. The position-identifying means may be constructed for connection to an existing article of clothing, for example as in the case of the belt or the article of footwear. In this case, the position-identifying means may include attachment means for attaching the position-identifying means to the article of clothing. The attachment means may be a clip attachment means, an adhesive, a pin attachment means or push-to-close and pull-to-open matrices of interlocking plastics members, for example Velcro (Registered Trade Mark). Alternatively, the position-identifying means may be constructed as an integral part of an item of clothing, for example as an integral part of a shoe or other article of footwear.

Preferably, the plan of the structure includes a geographic co-ordinate system. The monitor means may include a single plan of the structure, or a plurality of plans of the structure, for example a plan of each floor of a building in the case of a multi-storey building.

The inertial measurement unit preferably has its own battery.

Embodiments of the invention will now be described solely by way of example and with reference to the accompanying drawings in which.

Figure 1:
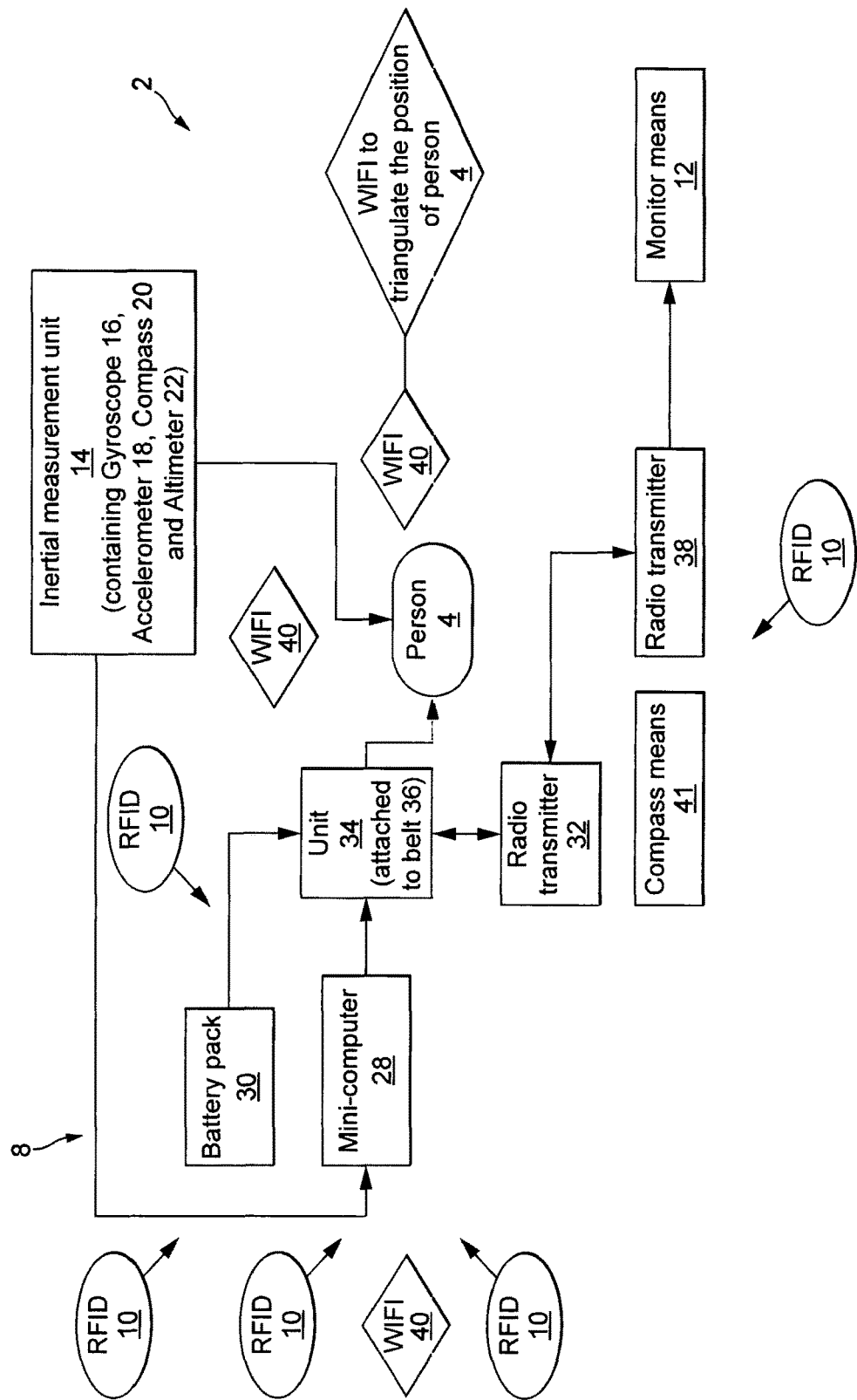
FIG. 1 shows schematically apparatus for tracking the position of at least one person in a structure.
Figure 2:
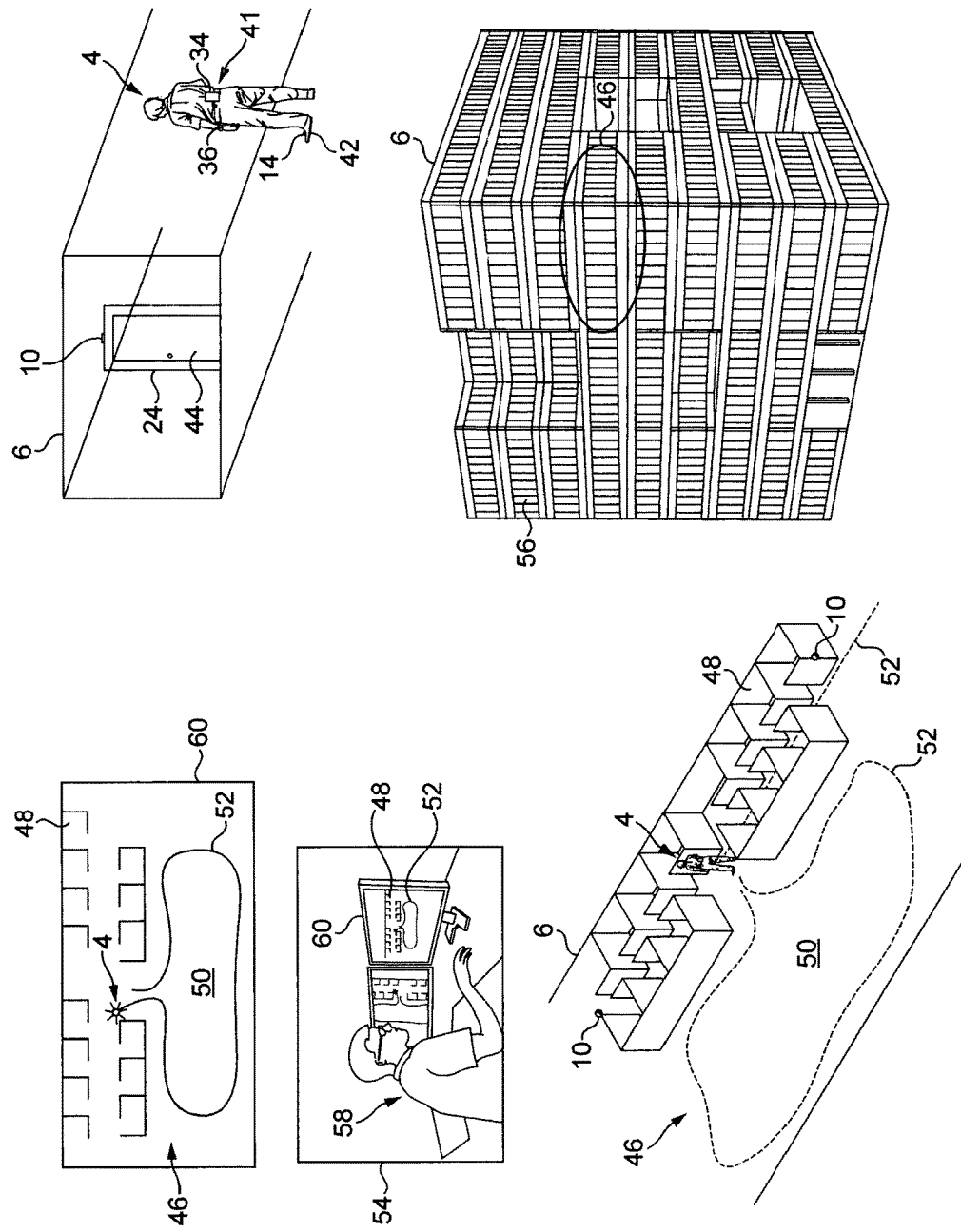
FIG. 2 shows a person in a structure and being tracked.

Referring to FIGS. 1 and 2, there is shown apparatus 2 for tracking the position of at least one person 4 in a structure in the form of a building 6. The apparatus 2 comprises position-identifying means 8 for being worn by the person 4. The apparatus 2 further comprises a plurality of position-determining devices in the form of radio frequency identification (RFID) devices 10. The RFID devices 10 are positioned at positions throughout the building 6 at which the person 4 must pass in order to move about the building 6. The apparatus 2 further comprises monitor means 12 for monitoring the position of the person 4 in the building 6.

The apparatus 2 is such that the RFID devices 10 emit pulses which are able to be received by the position-identifying means 8.

Each RFID device 10 emits pulses which only travel a short distance which is in the vicinity of the RFID device. Thus, as the person 4 walks about the building 6, the RFID devices 10 are in radio communication one at a time with the position-identifying means 8.

The position-identifying means 8 is in radio contact with the monitor means 12. The monitor means 12 includes a plan of the building 6, and the position of the RFID devices 10. The radio communication of the RFID devices 10 one at a time with the position-identifying means 8 enables the monitor means 12 to track the position of the person 4 as the person 4 walks about the building, with the position of the person 4 being determinable as being in the vicinity of each RFID device 10 as it becomes in radio contact with the position-identifying means 8.

The position-identifying means 8 includes an inertial measurement unit 14. The position-identifying means 8 is constructed for being worn on a part of the person 4 that enables the inertial measurement unit 14 to measure the gait of the person as the person is walking, whereby the inertial measurement unit 14 is able to indicate via the monitor means 12 a more exact position of the person 4 relative to each RFID device 10, and also the direction of movement of the person 4 relative to each RFID device 10.

The inertial measurement unit 14 comprises a gyroscope 16, an accelerometer 18, and an altimeter 20. The position-identifying means 8 is such that it includes compass means 41 which is compensated for magnetic distortion in the structure and which operates to correct any directional drift accumulated by the inertial measurement unit 14 over time. The compass means 41 takes readings when stable direction measurements are obtained in the structure. The inertial measurement unit 14 has its own battery for providing electrical power for the inertial measurement unit 14.

The combination of the RFID devices 10 and the inertial measurement unit 14 enables the monitor means 12 to show on the building plans the position and direction of movement of the person 4. The RFID devices 10 give the coarse position of the person 4. The inertial measurement unit 14 measures the person's walking gait and gives the precise position of the person 4 and also the direction of movement of the person 4. The inertial measurement unit 14 may not be able to determine its position in the building. The RFID devices 10 tell the inertial measurement unit 14 where it is in the building by virtue of the sequential contact of the RFID devices 10 with the inertial measurement unit 14. The RFID devices 10 correct any drifting of perceived location of the inertial measurement unit 14. The drifting of the inertial measurement unit 14 may be due to it relying on a gyroscope and an accelerometer, and/or due to different persons having different walking gaits. The inertial measurement unit 14 uses the accelerometer for measuring the speed of the person 4, and the gyroscope for measuring the direction of the person 4. The radio frequency unit 14 is in effect re-set continuously via each RFID device 10. The apparatus 2 is able accurately to track the person 4 for long periods of time, for example for periods of more than eight hours which is a normal working day. Preferably the building plan or plans have a geographic co-ordinate system.

The radio communication of the RFID devices 10 with the position-identifying means 8 is via Bluetooth. Bluetooth provides a convenient wireless technology standard for exchanging required data over short distances, for example using short wavelength radio waves in the ISM band of from 2.4-2.485 GHz. The pulses emitted by the RFID devices 10 may travel a distance of not more than approximately 1-10 meters, for example 2 meters.

As can be appreciated from FIG. 2, the RFID devices 10 are positioned at doorways 24, halls 26, lifts, or other positions throughout the building 6 at which the person 4 must pass in order to move about the building 6.

As shown in FIG. 1, the position-identifying means 8 includes not only the inertial measurement unit 14 and the compass means 41 but also a mini computer 28, a battery pack 30 and a radio transmitter 32. The battery pack 30 provides the required power for various parts of the position-identifying means 8. The mini computer 28, the battery pack 30, the radio transmitter 32 and the compass means 41 are worn as a unit 34 which is attached to a belt 36 worn by the person 4. The inertial measurement unit 14 is in communication with the mini computer 28 as shown schematically in FIG. 1.

The radio transmitter 32 communicates with a radio transmitter 38. Because the radio transmitter 32, 38 are in wireless connection with each other minimal cost is involved. The modem radio 38 communicates with the control means 12 and may form part of the control means 12. Connections between the various parts of the apparatus as shown in FIG. 1 are via Wi-Fi 40 as shown. The Wi-Fi 40 can be used to triangulate the position of the person 4 at any one time in the building 6. The apparatus 2 can be independent of mobile and satellite network operators. If there is a power failure, the apparatus 2 can still continue to function.

As shown in FIG. 2, the inertial measurement unit 14 is in the form of a device which is worn on the person 4, for example on a shoe 42 of the person 4. The wearing of the inertial measurement unit 14 on the shoe 42 assists in the inertial measurement unit 14 enabling the control means 12 to show not only the position of the person 4 in the building 6, but also to provide movement and trajectory tracking data for the person 4. As an alternative to the shoe 42, the inertial measurement unit 14 may be worn such that it is on the person's hip or the small of their back.

The compass means 41 is compensated for magnetic distortion in the building 6. More specifically, the compass means 41 has hard and soft iron magnetisable compensation parts which help to avoid magnet distortion in indoor environments in which the apparatus 2 is operating.

The compass means 41 is such that it operates to correct any directional drift accumulated by the inertial measurement unit 14 one time.

The compass means 41 also includes tilt compensating means. The tilt compensation adjusts the magnetic sensor in the compass means 41 for pitch and roll of the unit 34 caused by the person walking in the building 6.

FIG. 2 also shows how the person 4 may be at an arbitrary location 46 on the sixth floor of the building 6. n the arbitrary location 46, the person 4 may be walking through cubicles 48 located to one side of an open office space 50. The path that the person 4 has walked is shown as path 52. Two of the cubicles 48 are shown with the RFID devices 10.

A control room 54 may be located where desired in the building 6, for example at the illustrated position 56. In the control room 54, an operator 58 is able to see the person 4 and the path 52 on a monitoring screen 60.

The apparatus 2 is easily and cheaply produced. The apparatus 2 is also easily maintained. The apparatus 2 does not require expensive visual display units. The RFID devices 10 are easily located, as can be appreciated from FIG. 2 which shows a RFID device 10 located above a threshold of a door 44. The various parts of the apparatus 2 communicate in a wireless manner, which again facilitates ease and cheapness of installation. The inertial measurement unit 14 enables the position of the person 4 in the building 6 to be continuously tracked, and substantially irrespective of the construction of the building surrounding the person 4 at the time of the tracking.

Figure 3:
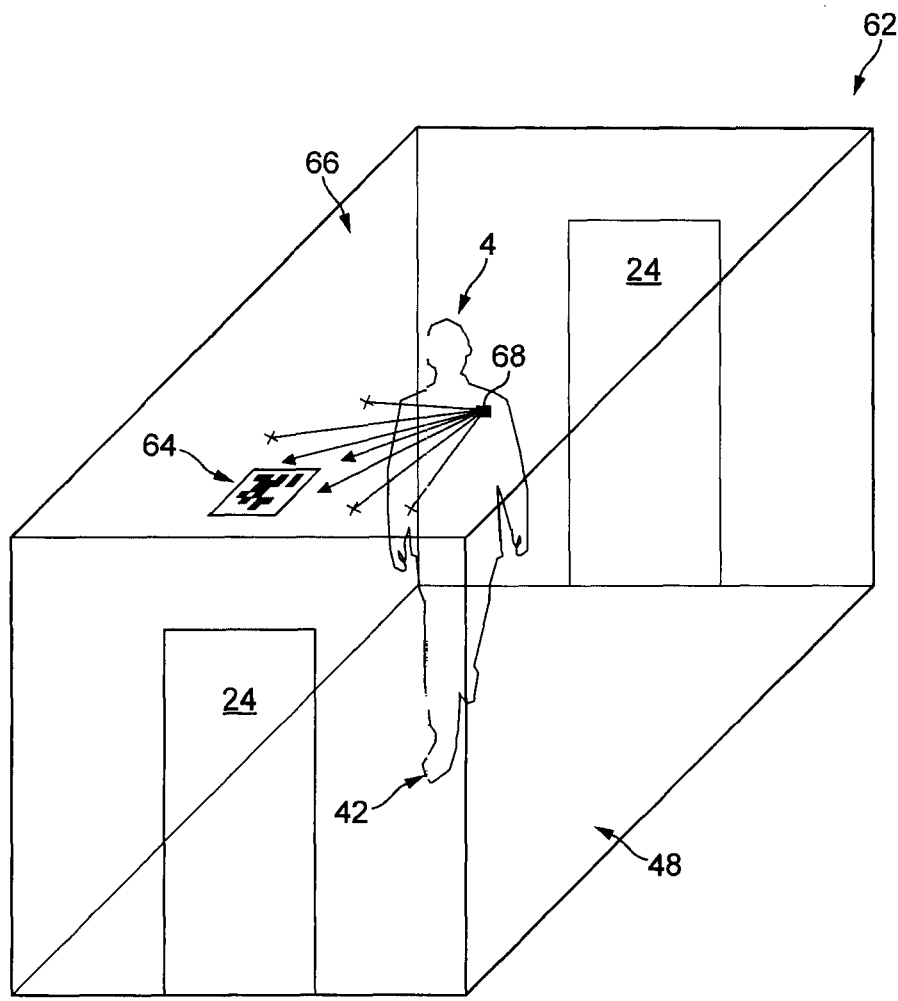
FIG. 3 shows part of apparatus of the present invention utilising orientation re-alignment means in the form of a plurality of fiducial markers, only one of which is shown for ease of illustration.

Referring now to FIG. 3, there is shown part of apparatus 62 of the present invention. Similar parts as in previous Figures have been given the same reference numerals for ease of comparison and understanding.

FIG. 3 shows the use of orientation re-alignment means in the form of a plurality of fiducial markers 64, only one of which is shown for ease of illustration. A fiducial marker 64 is shown on a ceiling 66 of a room or cubicle 48 having two doorways 24. The person 4 is wearing a camera 68.

In use of the apparatus 62, the fiducial markers 64 can be placed where desired on appropriate parts of a structure in the form of a building such for example as the building 6. The fiducial markers 64 re-align drift orientation errors occurred by the inertial measurement unit 14 on the shoe 42 of the person 4, and also as occurred by the monitor means 12. The camera 68 is worn as shown on the body of the person 4. With the appropriate computer software in the camera 68, the camera 68 is able to enable recognise the fiducial markers 64. The fiducial markers 64 act as reference points. The reference points may be regarded as fixed points or lines within a scene to which other objects can be related, or against which objects can be measured. The camera 68 is able to recognise the fiducial markers 64 through a process of collimation. The camera 68 is then able to be used to re-align the internal measurement means as required to the correct axis/orientation.

Figure 4:
FIG. 4 is an example of two fiducial markers.

FIG. 4 shows two fiducial markers 70, 72 which are shown as examples of fiducial markers that may be used in the apparatus 62.

Figure 5:
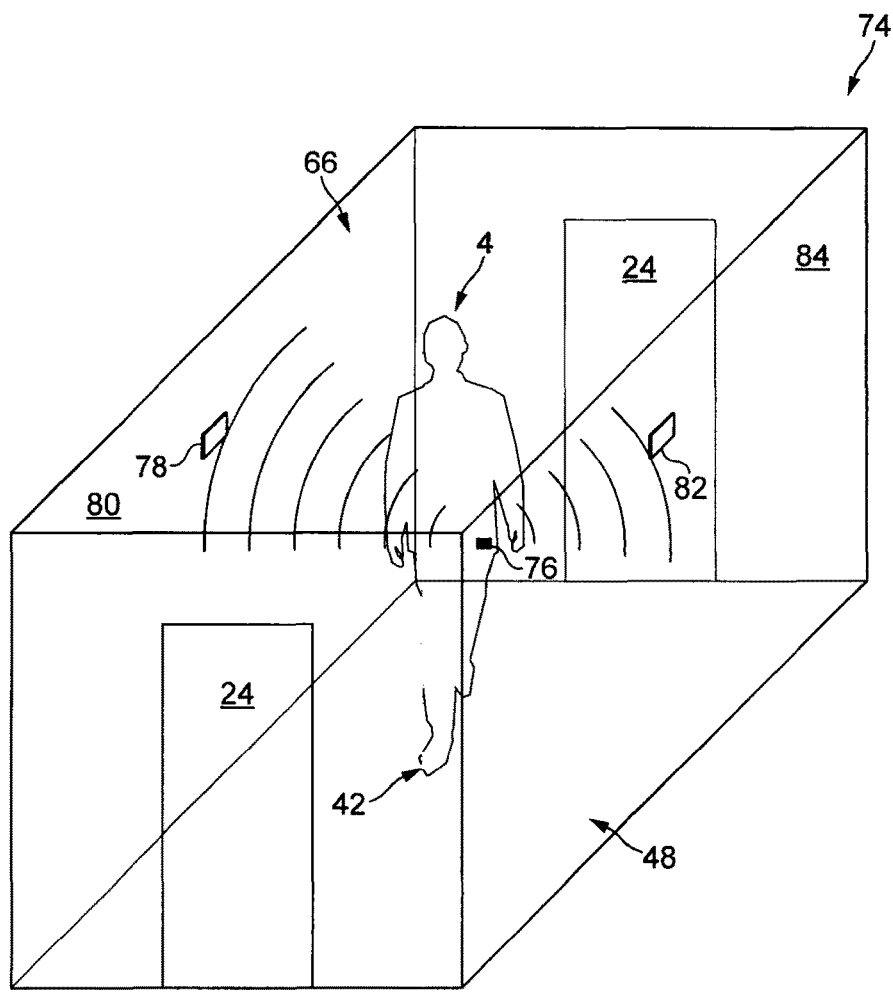
FIG. 5 show part of apparatus of the present invention utilising orientation re-alignment means in the form of a plurality of magnets.

Referring now to FIG. 5, there is shown part of apparatus 74 of the present invention. Similar parts as in previous Figures have been given the same reference numerals for ease of comparison and understanding. In FIG. 5, the person 4 is shown wearing a three-axis fluxgate magnetometer sensor 76 on their hip. A reference sensor in the form of a three-axis fluxgate magnetometer 78 is mounted on a wall 80 of the room or cubical 48. Another reference sensor in the form of a three-axis fluxgate magnetometer 82 is mounted on an opposite wall 84.

The apparatus 74 is able to operate as an alternative to the apparatus 62 shown in FIG. 3. More specifically, the apparatus 74 is able to operate to provide re-alignment of orientation for the inertial measurement unit 14 and which may be in the form of a device (not shown) which is worn on the shoe 42 of the person 4. Alternatively or in addition, the apparatus 74 is able to provide for the re-alignment of orientation of the monitor means 12. More specifically, a reference of orientation to the person 4 is able to be obtained using the sensors in the form of the three-axis fluxgate magnetometer sensor 76 mounted on the hip of the person 4 from the wall-mounted reference three-axis fluxgate magnetometer sensors 78, 82 mounted on the walls 80, 84 respectively. If the magnetometers 78, 82 have their axes aligned with geographic north, then this provides a physical and constant reference that is not subject to change. If the reference sensor 76 were to be fixed horizontally to geographic north, then the readings from this reference sensor 76 represent the position of the earth's field at that location relative to a physical orientation. Due to the physical alignment, the apparatus 74 can correlate with the measurements from the sensor 76 mounted on the person 4. The sensor 76 mounted on the person 4 would be orientated on every person 4 in a consist way in order to correlate field readings with a heading of the person.

It is to be appreciated that the embodiments of the invention described above with reference to the accompanying drawings have been given by way of example only and that modifications may be effected. Thus, for example, the RFID devices 10 may alternatively be position-determining devices in the form of passive infrared devices, or position-determining devices in the form of WiFi enabled devices. The unit 34 may be worn by the person 4 at a position other than on their belt 36. The inertial measurement unit 14 may be worn or mounted on the person 4 other than on their shoe 42. As many parts as required may be formed as a miniaturised package for being worn wherever desired on the person 4. As many persons 4 as suitable and required may be tracked using the apparatus of the invention. The person 4 may be persons working in working conditions which render the persons 4 vulnerable, for example as occurs in nuclear and petro-chemical buildings, mines, oil refineries, and high security Government complexes. The apparatus of the present invention enables security personnel to know that workers are safe, and without the workers having to report in. The wording on the drawings is given for the purpose of enabling the drawings easily to be understood, and the wording is not to be interpreted in a limiting manner. Individual components shown in the drawings are not limited to use in their drawings and they may be used in other drawings and in all aspects of the invention.

The invention claimed is:

1. Apparatus for tracking the position of at least one person walking in a structure, the apparatus comprising:
   (i) position-identifying means for being worn by the person;
   (ii) a plurality of position-determining devices for being provided at known fixed positions throughout the structure at which the person must pass in order to move in the structure; and
   (iii) monitor means for monitoring the position of a person in the structure;
   and wherein:
   (iv) the position-determining devices emit signals which are able to be received by the position-identifying means;
   (v) each position-determining device emits signals which only travel a distance which is in the vicinity of the position-determining device, whereby as the person walks in the structure, the position-determining devices are in radio communication one at a time with the position-identifying means;
   (vi) the position-identifying means is in radio contact with the monitor means;
   (vii) the monitor means includes a plan of the structure and the position of the position-determining devices, whereby the radio communication of the position-determining devices one at a time with the position-identifying means enables the monitor means to track the position of the person as the person walks in the structure, with the position of the person being determinable as being in the vicinity of each position determining device as it becomes in radio communication with the position-identifying means;
   (viii) the position-identifying means includes an inertial measurement unit; and
   (ix) the position-identifying means includes compass means which is compensated for magnetic distortion in the structure and which operates to correct any directional drift accumulated by the inertial measurement unit over time; and
   (x) the position-identifying means is constructed for being worn on a part of the person that enables the inertial measurement unit to measure the gait of the person as the person is walking, whereby the inertial measurement unit is able to indicate via the monitor means a more exact position of the person relative to each position-determining device and also the direction of movement of the person relative to each position-determining device.

2. Apparatus according to claim 1 in which the position-determining devices are passive infrared devices.

3. Apparatus according to claim 1 in which the position-determining devices are radio frequency identification (RFID) devices.

4. Apparatus according to claim 1 in which the position-determining devices are WiFi enabled devices.

5. Apparatus according to claim 1 in which the inertial measurement unit comprises a gyroscope and an accelerometer.

6. Apparatus according to claim 1 and including orientation re-alignment means for re-aligning drift orientation errors occurred by the position-identifying means and/or the monitor means.

7. Apparatus according to claim 6 in which the orientation re-alignment means is a plurality of fiducial markers.

8. Apparatus according to claim 7 in which the orientation re-alignment means is a plurality of magnets.

9. Apparatus according to claim 1 in which the radio communication of the position-determining devices with the position-identifying means is via Bluetooth.

10. Apparatus according to claim 1 in which the signals emitted by the position-determining devices travel a distance of not more than approximately 1-10 meters.

11. Apparatus according to claim 1 in which the signals emitted by the position-determining devices travel in a radius.

12. Apparatus according to claim 1 in which the position-determining devices are positioned at doorways, lifts, halls and corridors of the structure.

13. Apparatus according to claim 1 in which the position-identifying means is adapted to be worn on or as part of a belt or an article of footwear.

14. Apparatus according to claim 1 in which the position-identifying means includes attachment means for attaching the position-identifying means to an article of clothing.

15. Apparatus according to claim 1 in which the plan of the structure includes a geographic co-ordinate system.

* * * * *